United States Patent [19]

Parker et al.

[11] Patent Number: 5,677,805
[45] Date of Patent: Oct. 14, 1997

[54] APPARATUS FOR DETERMINING THE DYNAMIC POSITION AND ORIENTATION OF A TRANSDUCING HEAD RELATIVE TO A STORAGE MEDIUM

[75] Inventors: William P. Parker, Waitsfield, Vt.; Nahum Guzik, Palo Alto, Calif.; Edward Fredkin, Brookline, Mass.

[73] Assignee: Guzik Technical Enterprises, San Jose, Calif.

[21] Appl. No.: 476,626

[22] Filed: Jun. 7, 1995

[51] Int. Cl.$^6$ ............................................. G11B 21/02
[52] U.S. Cl. ................ 360/75; 360/77.03; 360/78.11; 356/375
[58] Field of Search ............. 356/375; 360/77.03, 360/78.11, 75, 103, 109; 369/53, 54, 55, 58, 44.11

[56] References Cited

U.S. PATENT DOCUMENTS

| | | | |
|---|---|---|---|
| 3,338,656 | 8/1967 | Astheimer | 359/238 |
| 3,695,767 | 10/1972 | George | 360/103 |
| 3,759,618 | 9/1973 | Rogers | 356/375 |
| 4,165,155 | 8/1979 | Gordon, II et al. | 359/222 |
| 4,286,468 | 9/1981 | Altman | 73/655 |
| 4,322,979 | 4/1982 | Fromm | 73/705 |
| 4,451,123 | 5/1984 | McNeill et al. | 359/263 |
| 4,593,368 | 6/1986 | Fridge et al. | 360/75 |
| 4,624,564 | 11/1986 | Dahlgren | 360/103 |
| 4,813,782 | 3/1989 | Yagi et al. | 356/357 |
| 4,901,185 | 2/1990 | Kubo | 360/103 |
| 4,961,123 | 10/1990 | Williams | 369/44.11 |
| 5,220,408 | 6/1993 | Mager | 356/372 |
| 5,225,690 | 7/1993 | Sakai | 356/375 |
| 5,257,093 | 10/1993 | Mager | 356/375 |
| 5,280,340 | 1/1994 | Lacey | 360/75 |
| 5,311,287 | 5/1994 | Amer | 356/375 |
| 5,349,443 | 9/1994 | Guerra | 356/376 |

OTHER PUBLICATIONS

S. Zhu et al., "Frustrated Total Internal Reflection: A Demonstration and Review", American Journal of Physics, vol. 54, No. 7, pp. 601–607, Jul. 1986.
John M. Guerra, "Photon Tunneling Microscopy", Applied Optics, vol. 29, No. 26, pp. 3741–3752, Sep. 1990.
M. Suk et al., "Comparison of Flying Height Measurement Between Multi–Channel Laser Interfermometer and the Capacitance Probe Slider", IEEE Transactions on Magnetics, vol. 27, No. 6, pp. 5148–5150, Nov. 1991.
C. Lacey et al., "Inteferometer Measurement of Disk/Slider Spacing: The Effect of Phase Shift on Reflection", IEEE Transaction on Magnetics, Sep., 1993.
Phase Metrics, "Dynamic Flying Height Tester", Phase Metrics, 3978 Sorrento Valley Blvd., San Diego, CA 92121.

*Primary Examiner*—Aristotelis M. Psitos
*Assistant Examiner*—Alan Faber
*Attorney, Agent, or Firm*—Lappin & Kusmer LLP

[57] ABSTRACT

An apparatus for determining the position and/or orientation of a transducing head positioned on one side of and close to a rotating transparent-core magnetic storage disk. Light is introduced into the disk to establish total internal reflection therein. A detector disposed on the other side of the disk opposite the head detects the intensity of light on the interior region of the disk. The detected intensity is representative of the separation of the head from the disk.

26 Claims, 3 Drawing Sheets

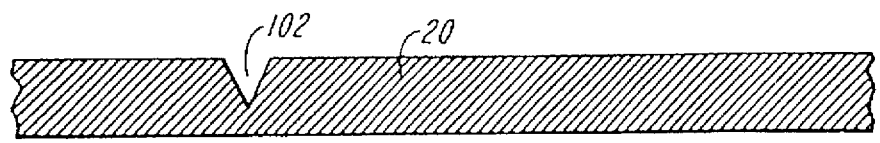
FIG.5A
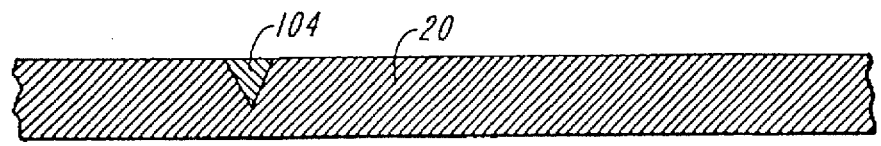
FIG.5B
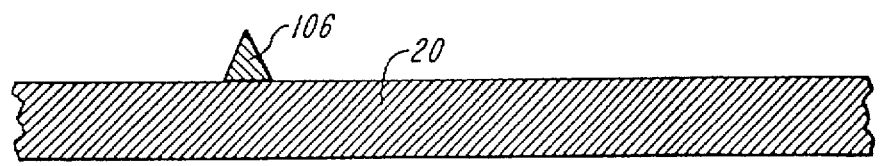
FIG.5C
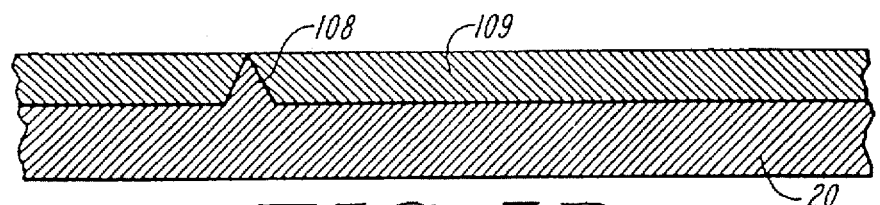
FIG.5D
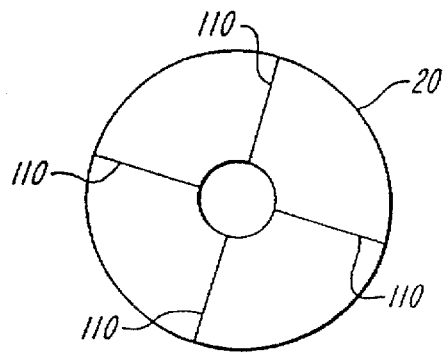 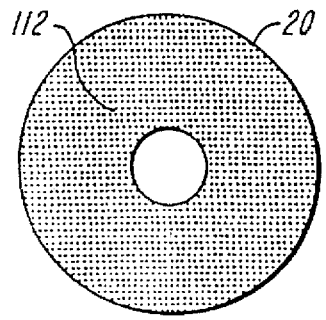
FIG.5E    FIG.5F

APPARATUS FOR DETERMINING THE DYNAMIC POSITION AND ORIENTATION OF A TRANSDUCING HEAD RELATIVE TO A STORAGE MEDIUM

FIELD OF THE INVENTION

The present invention relates to measuring small distances, specifically an optical apparatus and method for measuring a gap between closely spaced objects, such as a magnetic transducing head and a magnetic storage disk as they move relative to one another.

BACKGROUND OF THE INVENTION

Most digital computer systems include a data storage device which includes a rotating magnetic material-coated disk and an associated transducer for storing information on and retrieving information from the magnetic material on the disk. Information is stored and retrieved in accordance with well known conventions and formats that permit high density storage, rapid access to data locations, high reliability of system components as well as data integrity, and generally small size. In order to improve these system characteristics, many approaches are taken, for example, development of improved storage media and transducers and others. One principal area that is particularly addressed in high performance systems, is improvements in the control of the relative position of the transducer and rotating disk. In high performance storage systems, the disk and transducers, or heads, are constructed to be within well-controlled physical tolerances. Generally, the disk is to rotate at a high rate and the head is biased toward the disk. The relative air flow between the head and the disk causes the head to ride on a cushion of air established by the high rate rotation of the disk coupled with the aerodynamics of the head. In some forms, the head is suspended with respect to the disk with a spring-biased force; in other forms, the aerodynamics of the head may cause the head to seemingly "float" in a relatively small range of motion displaced from the rotating disk.

In all of such systems, it is important to control the displacement of the head relative to the rotating disk. Generally, smaller head-to-disk spacing permits increased accuracy of transduction of information stored on the disk. The space between the head and the disk is referred to as the "head gap" or "gap", and for conventional high performance systems, is on the order of millionths of inches, or microinches.

In order to provide precise control of the head gap, the aerodynamics of the head is a primary design parameter. In the design process, as well as in production, it is important to be able to measure the head gap, as well as the orientation of the head, in order to assure that a system can or will meet desired performance criteria. Such measurement have proved to be difficult to obtain with sufficient precision to permit design and operation of optimal systems.

At the present time, several optical techniques are most effectively used to dynamically measure a nanometric gap between a magnetic transducer, or head, and the rotating magnetic disc, of a computer data storage system.

One measuring method is based on the phenomenon of interference between light beams, which is called optical interferometry. That method is based on the mutual interference effect wherein two optical wave trains produce lines, bands, or fringes which are alternately light and dark or variously colored. When measuring separation between two objects having nearly parallel mutually facing surfaces, where one of the objects is transparent, a beam of light is directed into the gap to be measured through the body of the transparent object in such a way that the axis of the beam is essentially normal to the facing surfaces. Beams, reflected from the surfaces of both objects are ultimately recombined at a detector element and the fringes are "read". The optical system is designed so that the path difference between the beams is related to the spacing the instrument is intended to measure. It is known from optics that the fraction of the original radiation collected by the detector depends in part on the ratio of the path difference to the radiation wavelength. This relationship is used as a calibration table for spacing measurements.

A particular application optical interferometry, disclosed in U.S. Pat. No. 4,813,782 (Yagi et al.), is the measurement of the nanometric space between a magnetic head of a computer disk drive and a flat reference disk. To simulate the working conditions of a hard disk drive, the reference disk is rotated at a high speed and the head, pressed downward by a spring, floats above the disk on a dense air cushion which is created by the rotation of the disk. The head thus "flies" or has a "flying height" above the reference disk, so that the reference disk may be used to dynamically test the flying behavior of the magnetic head. The reference disk is made of an optically transparent material, such as glass, and the light beam is directed through the disk from the side opposite to the magnetic head. Components of the beam, reflected from surfaces bounding the air cushion, eventually produce interference and the resultant fringes are "read" to deduce spacing information through use of a calibration curve.

The main drawback of the above method is the inaccuracy of the calibration table near its minimum and maximum points, where the flat regions in the curve significantly degrade measurement precision. Specifically, this is the case when the separation between the head and the disk approaches one quarter of the optical wavelength. Moreover, commercially available devices are unable to take measurements at several points on the magnetic head at the same time. Therefore, time consuming point-by-point measurements have to be performed in order to obtain a map of surface-to-surface proximity. Currently, 90 nanometers is the smallest space that can be reliably measured using a commercially available spectrophotometric instrument to measure the spectral intensity distribution of the reflected light.

Another optical method that is used to measure the space between objects is based on a phenomenon known as frustrated total internal reflection. Total internal reflection may be observed when an electromagnetic wave, for example a ray of light, approaches an interface between two media at an oblique incidence angle. If the light originates from the side of the denser of the two media and the incidence angle exceeds a certain critical value, known as the Brewster angle, all radiation energy is reflected back into the medium in which it originated.

It is further known that if the second medium is present in the form of a thin film and is followed by a third medium, which is more dense than the second, a portion of the incident radiation penetrates through the film, regardless of the Brewster angle, and propagates into the third medium. This latter phenomenon is known as frustrated internal reflection and also as "photon tunneling". In this case, the fraction of radiation reflected back into the first medium, as well as the fraction transmitted through the film, is determined in part by the ratio of the thickness of the second medium to the radiation wavelength, in part by the complex refractive index of the third medium, and also by the polarization of incident radiation.

An apparatus which determines the proximity of a stationary glass surface to another surface by employing the phenomenon of frustration of total internal reflection of light energy from the glass surface is disclosed in U.S. Pat. No. 4,681,451 (Guerra et al). The device is used to determine the gap between a magnetic head and a magnetic recording medium. In the mechanism, a glass block is substituted for the conventional magnetic head, and a medium, e.g., a magnetic disk, may be set into motion to develop aerodynamic characteristics incident to establishing the spacing between a surface and the glass block surface.

The main disadvantage of this proximity imaging device is its inability to test the dynamic behavior and to measure the flight elevation of an actual magnetic head, as may be needed by a magnetic head manufacturer, or consumer, for quality control purposes. Even though some of the conditions inside a disk drive can be simulated by executing a replica of the head in glass, the remits obtained in this manner are inaccurate. Furthermore, fiber-optic attachments, secured to the glass head, change the aerodynamic properties of the disk/bead system. Because the size and mass of the optical system required is substantial, the device can not be used to test miniature flying magnetic head designs, nor can it exhibit the dynamics of an actual spring mounted head weighing a small fraction of a gram. Thus, the apparatus can not be used to test the characteristics of an actual head.

A different version of this apparatus which determines the proximity of a rotating glass surface to another surface employing frustrated internal reflection is disclosed in U.S. Pat. No. 5,257,093 (Mager et al.). In that patent, a device is used to determine the gap between a real magnetic head and a surrogate magnetic recording medium, represented by a pair of glass lenses. In the mechanism, a conventional magnetic head, and a transparent medium, e.g., a glass lens with an exterior plano surface, may be set into motion to develop aerodynamic characteristics incident to establishing the spacing between the surface of the glass lens and the magnetic head in situations analogous to actual use.

Two lenses and two prisms are required by that apparatus in order to couple the illumination energy into the surface undergoing frustration of its total internal reflection and to view the resulting internal reflection prior to measuring the light loss for purposes of determining the distance to the head. The apparatus requires lenses that are physically large and heavy, and made more complex because of the need for accurately aligned prisms mounted to one of their surfaces. In order to withstand relative motion at several thousand revolutions per minute, these lenses must be fabricated to severe tolerances and must be contained in a strong housing in case they are broken while moving. As such the system is costly, complex and of limited usefulness.

It is an object of the present invention to provide an apparatus for measuring nanometric distances which overcomes the foregoing disadvantages.

Another object is to provide an improved apparatus for determining the position of a transducing head relative to a rotating disk.

Yet another object is to provide an improved apparatus for determining the orientation of a transducing head relative to a rotating disk.

Other objects of the invention are to provide an apparatus which can measure the flight elevation and test the dynamic behavior of an actual magnetic head for purposes of development, production and quality control. The apparatus of the invention is simple, robust, has few moving parts and is relatively inexpensive to manufacture.

SUMMARY OF THE INVENTION

The invention is an apparatus for determining the position and/or orientation of a transducing head relative to a rotating disk. The function of the invention is based on the phenomenon of photon tunneling that can occur under certain circumstances when two surfaces are very close to one another. Specifically, the invention monitors the tunneling of photons across a small gap between a transparent material, such as a surrogate magnetic storage disk, that is illuminated in such a way that an evanescent electromagnetic field is present at a surface that is in close proximity to a second surface, such as a transducing head. The intensity of the tunneled field is determined by the gap between the illuminated surface and the second surface, and decays exponentially with distance. Distances of less than three quarters of the wavelength of the illuminating electromagnetic field may be accurately measured this way. Comparison of the intensity of the tunneled photon flux to the background intensity gives a direct, accurate and reproducible measure of the gap that exists between the two surfaces.

The distance measurement apparatus of the invention has a very high temporal bandwidth, limited only by the mount of electromagnetic flux present in the evanescent field and the electro-optic speed and sensitivity of a detector for tunneling photons. With a high speed silicon photodiode detector, this bandwidth can be in excess of several tens of megahertz. Thus, the invention can be useful in determining the dynamic characteristics of a magnetic recording transducer that is in close proximity to a surface that is analogous to a magnetic recording disk.

In current data storage usage, the transducer, also referred to as a magnetic recording head or simply "read-write head", may be spring loaded toward the magnetic recording disk or simply "magnetic disk" with a force of from a few hundred milligrams to a few grams.

When the relative motion between the magnetic disk and read-write head reaches a high enough velocity, the head will be supported away from the disk by a cushion of air. At this point the head is said to be flying, and the distance between the head and the disk is referred to as the flying height.

A number of factors influence the aerodynamics of the head/disk system, including head shape, surface flatness of head and disk, disk waviness and head angle relative to disk radius. Some of these influencing factors will change during use such as the angle of the head relative to the radius of the disk or "skew angle." The head may exhibit very complex aerodynamic behavior including motion in several transnational and rotational axis simultaneously. The apparatus of the invention permits observation, monitoring and measurement of the flying height and flight characteristics of a particular head design, and which are of initial importance during the manufacture of these designs testing and verification of their performance.

In one form, the invention is an apparatus for determining characteristics of a magnetic transducing head, where the head includes a reference surface having at least one reference point.

A substantially transparent rigid disk is disposed in a fluid environment characterized by a predetermined index of refraction. The disk has an interior region extending between a first planar circular surface and a second planar circular surface and is within an outer peripheral lateral surface. The first and second surfaces are parallel and coaxial with respect to a central axis transverse to the first and second surfaces. The interior region is characterized by an index of refraction greater than said predetermined index of refraction of the fluid environment.

The recording head is positioned with its surface opposite the first surface of the disk, and is biased toward the disk along a bias axis extending at least in part in the direction of the central axis. A driver is adapted to rotate the disk about the central axis so that the reference surface is spaced apart from the first surface of the rotating disk in response to a relative air flow between the reference surface and the first surface.

An illumination assembly directs light into said disk at an angle with respect to the first and second surfaces so that substantially total internal reflection of the direction light is established within the interior regions of said disk. A detector assembly is disposed opposite the second surface of the disk. That assembly includes a detector which detects the intensity of light in the interior region of the disk at the reference point on the reference surface of the head, and generates an intensity signal representative of the detected light. The separation of the reference surface with respect to the first surface of the disk is determined from the intensity signal.

In some embodiments, the detector detects the intensity of light in the interior region of the disk at points opposite three reference points on the reference surface of the head and generates a signal representative thereof. From the latter signal, the position and orientation of the reference surface with respect to the first surface of the disk is determined.

The present invention permits quick, accurate and reproducible flying height measurement and aerodynamic testing of magnetic read-write heads. In the invention, the flying height and aerodynamic characteristics of a given head design may be accurately determined by measuring the light intensity corresponding to a limited number of sample points observed in the head surface/disk surface gap. As only three points are required to describe a plane, head dynamics are easily determined from the measured distance between the disk and three points, given by the intensity measured at each of the three points.

The present invention also may be used to define an electrooptic system for flying height testing of magnetic read-write heads, aerodynamic measurements of read-write heads, testing and measurement software, the flying height measurement disk required for the method including flying height calibration means integral to the disk and other auxiliary optical systems and components as are integral to the flying height tester. Additional embodiments of the invention are possible, as are variations in the geometry and layout of the apparatus including other optical imaging systems and means of illumination. The basic concept of the present invention can be preserved in numerous configurations.

BRIEF DESCRIPTION OF THE DRAWINGS

The foregoing and other objects of this invention, the various features thereof, as well as the invention itself, may be more fully understood from the following description, when read together with the accompanying drawings in which:

FIGS. 5A–F show in section exemplary disks having calibration regions in accordance with the invention, including a groove, a filled groove, a ridge, a planarized ridge, radial lines and a uniform dot pattern, respectively.

DESCRIPTION OF THE PREFERRED EMBODIMENT

Figure 1:
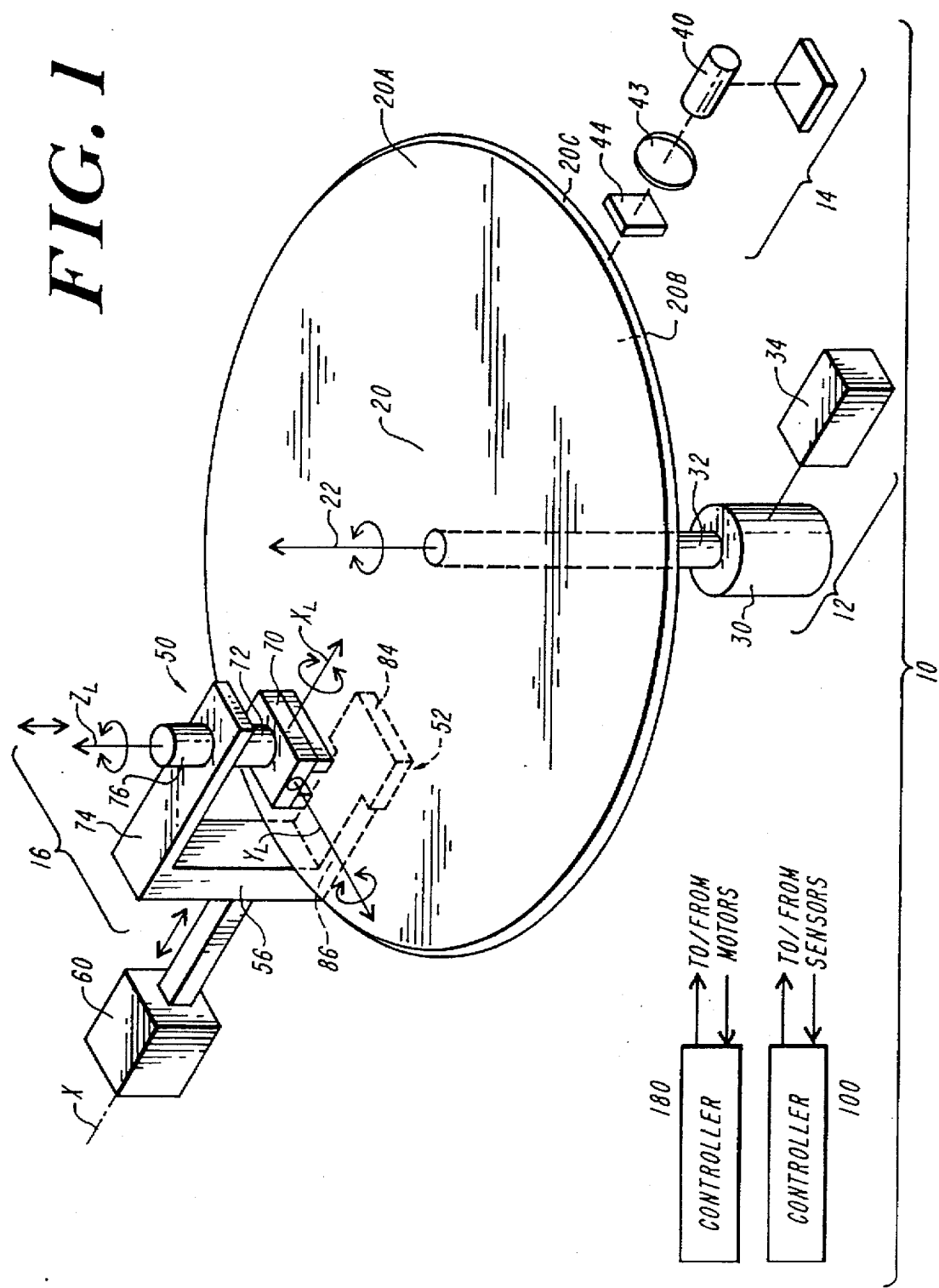
FIG. 1 shows in perspective view, a measurement system embodying the invention.
Figure 2:
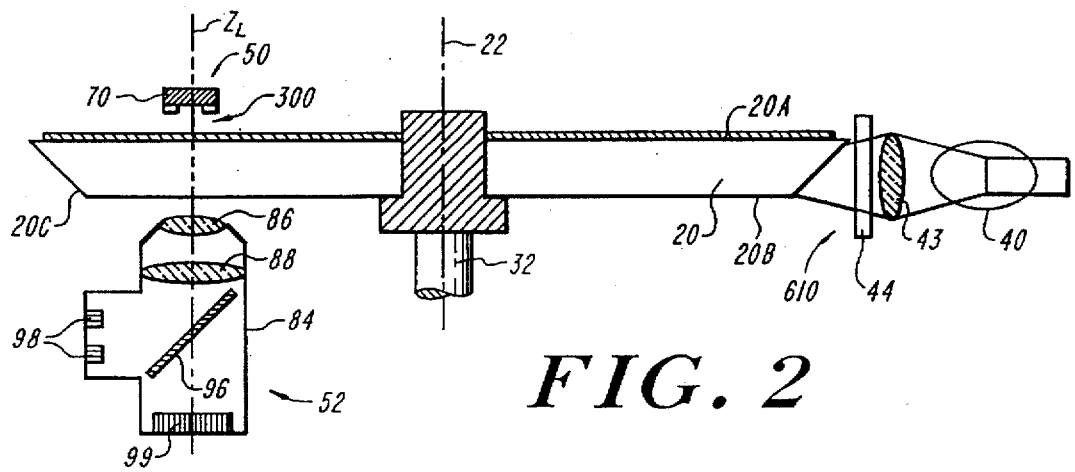
FIG. 2 shows a sectional view of the system of FIG. 1.

A measurement system 10 embodying the invention is shown in FIGS. 1 and 2. System 10 includes a disk assembly 12, an illumination assembly 14 and a head/detector assembly 16. The disk assembly 12 is in a fluid environment. Preferably the fluid environment is gaseous, such as air, but may alternatively be a liquid, or may just include a liquid coating on the disk and be gaseous otherwise. The environment is characterized by a predetermined index of refraction (IR); where the fluid environment is air, IR is approximately equal to 1.000.

The disk assembly 12 includes a light-transmissive disk 20 adapted for rotation about central axis 22. Disk 20 extends axially along axis 22 between an upper circular, substantially planar surface 20A an a lower circular substantially planar surface 20B and is bounded radially by an outer peripheral surface 20c, thereby defining an interior region within those boundaries. In the preferred embodiment, disk 10 is made of glass, preferably of the type and dimensions of a similar glass structure used in a conventional disk memory system, but without a magnetic material film coating, thereby forming an analog to a memory disk. In the preferred embodiment, the index of refraction of the disk is 1.52. The outer peripheral surface 20C is edge ground at a 45 degree angle and polished in order to permit efficient injection of light through that surface 20C to the interior region of disk 20.

Disk 20 is coupled to a Z-drive motor 30 by way of a spindle 32 extending along axis 22. A drive controller 34 is selectively operative to control motor 30 rotate disk 20 about axis 22, for example, at 800 rpm.

The illumination assembly 14 includes a light source 40 and associated power supply 42, lens 43, and a polarizing filter 44. Source 40 may be an incandescent source, or may be a laser or light emitting diode. In the illustrated example, the polarizing filter 44 is arranged to pass to surface 20C, only light which is linearly polarized along an axis perpendicular to the surfaces 20A and 20B, thereby providing a relatively good signal-to-noise ratio performance. In alternate configurations, the filter 44 may be omitted, but with degraded signal-to-noise ratios.

The source 40 includes focusing lens 43 which directs light toward the outer peripheral surface 20C of disk 20 at an angle so that the light incident on surface 20C enters the interior region of disk 20, and through that surface at an predetermined angle with respect to surfaces 20A and 20B, taking into account the indices of refraction of the disk 20 and the fluid environment, such that total internal reflection occurs.

The source 40 may also use fiber optics, prism(s) or a diffraction grating to couple the light into evanescent modes existing at the interface of the glass disk and the air. Various thin film coatings can be applied to the disk in order to improve edge illumination efficiency and enhance the signal-to-noise ratio of the detected tunneled photons. Grooves, scratches, pits, bumps or other marks in the disk coating and/or the glass disk surface may be used for calibration means as will discussed below.

The head/detector assembly 16 includes a head portion 50 disposed above surface 20A and a detector portion 52. Sections 50 and 52 are rigidly coupled by a connector bar 56, forming a unitary structure. That unitary structure is coupled to an x-drive motor 60 adapted to selectively translate that structure along an X axis which is transverse to axis 22. That unitary structure is further coupled to an Y-drive motor 62 adapted to selectively translate that structure along a Y-axis which is orthogonal to the X axis and axis 22.

The head portion 50 includes a head 70 which is serially a coupled by way of a coupling assembly 72 and rigid arm 74 to connector bar 56. As described below in more detail, the coupling assembly 72 is a generally compliant, and permits linear motion of head 70 along a local vertical axis $Z_L$ and rotation about that axis, and rotational motion of head 70 about local axes $X_L$ and $Y_L$, where axes $X_L$, $Y_L$ and $Z_L$ are orthogonal. In the preferred form of the invention, a motor 76 is adapted to selectively control the angle of head 70 about axis $Z_L$, so that a desired skew may be effected with respect to disk 20.

All selective motor control described above is accomplished under the control of a controller 80, which may be, for example, a programmed digital computer. With this configuration head 70 may be selectively driven in X-Y plane and skewed with respect to disk 20 so that head 70 may be positioned over any desired portion of surface 20A.

The detector portion 52 includes a detector which is coupled by way of arm 82 to connector bar 56 so that detector 82 is opposite surface 20B of disk 20 and always underlies head 70 of head portion 50.

Figure 3A:
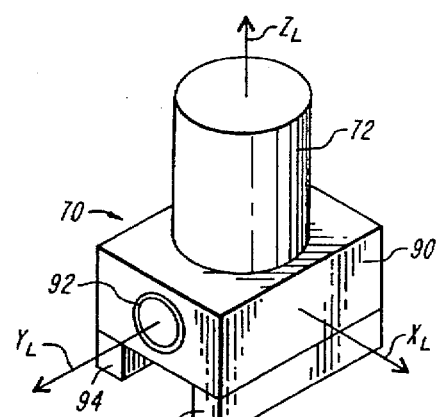
FIG. 3A shows in perspective view an exemplary head for the system of FIG. 1.
Figure 3B:
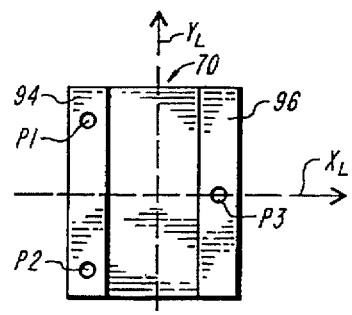
FIG. 3B shows in plan view the underside of the head of the FIG. 3A.

An exemplary head 70 is shown in detail in FIG. 3A. Head 70 includes electromagnetic coil 92 on one end a rectangular parallel piped transducer block 90 extending along axis $Y_L$ and having two flight rails, or sliders 94, 96 extending in the direction of that axis on its underside, i.e. closest to surface 20A of disk 20. The head 70 as shown is merely illustrative, and it will be understood that in practice other shaped heads may be used, with specifically designed aerodynamic shapes. The coupling assembly 72 may be an pressurized air piston/cylinder assembly, for example, which biases head 70 toward surface 20 along axis $Z_L$ with an effective spring force over a desired range of motion, while permitting small linear motion along that axis, as well as small rotational motions about axes $X_L$ and $Y_L$. FIG. 3B shows the underside of head 70, with three reference points P1, P2 and P3 illustrated on the lowermost surface of rails 94, 96. Points P1, P2 and P3 define a reference plane representative of the orientation of head 70 relative to the plane of the X and Y axes and thus to surface 20A.

The detector 84 is illustrated schematically in FIG. 2. That detector is coupled to motor 76 so that detector 84 tracks rotational motion of head 70 about axis $Z_L$. The detector 84 includes lenses 86 and 88, a beam splitter 96, a first detector array 98 and a second detector array 99. The beam splitter 96 is positioned opposite surface 20B and underlying head 70. Beam splitter 96 splits light passing from surface 20B in the direction of the $Z_L$ axis so that a portion of that light is incident on detector array 98 and another portion is incident on detector array 99. In the illustrated embodiment, detector array 99 is a rectangular CCD array corresponding to the shape of the lowermost surface of head 70. As a result, array 99 provides a signal representative of light propagating from the interior region of disk 20 underlying the entire head 70, and thus provide an image of that underside. Detector array 98 include a set of three diode detector elements positioned to be optically opposite a correspondingly positioned of points P1, P2 and P3. As a result, each detector of those arrays detects light from the interior region of disk 20 underlying the respective one of those points, and provides a signal representative of the interests of that detected light.

In operation, as the position and orientation of head 70 changes, distance varies from points P1, P2 and P3 to surface 20A. As that distance changes, correspondingly different amounts of photon tunneling occurs (i.e. as effanescent fields in the head gap draw off light from the interior region of disk 20). Consequently, the brightness of those regions underlying head 20 varies where viewed from detector 84. That detector images the overall variation in detector array 98 and the specific points P1, P2 and P3 in detector array 99. The resultant signals are processed in a computer 100 to determine from the detected intensity variations, the distance variations between points P1, P2 and P3 and surface 20A. Those restrictions are used by a computer 100 to generate signals representative of the dynamic position and orientation of head 70 with respect to surface 20A of disk 20.

Figure 4:
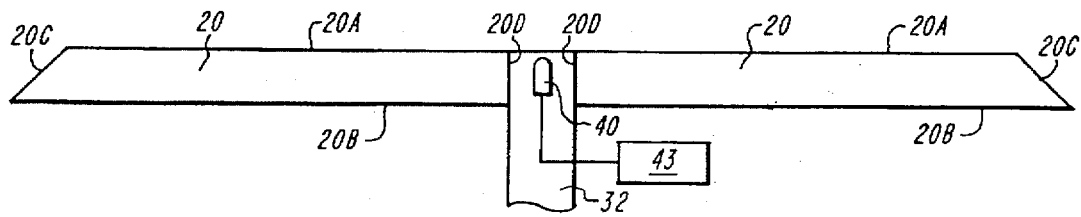
FIG. 4 shows in section an alternate form of the invention.

FIG. 4 shows an alternate form of the invention in which a system 10' is generally similar to system 10 of FIGS. 1 and 2, but where the disc 20 is annular and where the light assembly 14 directs light radially from spindle 32, radially outward to the disk 20. In the system 10', disk 20 extends transverse to axis 22 from an interior peripheral surface 20D to the outer peripheral surface. In this form, the surface 20D is adapted to receive light which is directed by source 20 to effect total internal reflection in the interior region of disk 20. Otherwise, system 10' operates in the same manner as system 10, described above.

The system 10 of present invention also may be adapted so that self-calibration may be accomplished. To adapt system 10 to accomplish this task, detector portion 52 is independently adjustable (i.e. without tracking of head portion 50 to underlie specific calibration regions of disk 20. The disk 20 is provided with calibration regions on surface 20 which extract a predetermined light from the interior region of the disk, which in turn establish a decrease in brightness when viewing surface 20B, which corresponds to a predetermined head gap. Thus, with the detector portion 52 underlying the calibration region, the signal generated at the detector (representative of light intensity from the overlying portion of surface 20B) can be stored in computer 100 as a reference valve for the associated head gap value. In accordance with the invention, there are many ways the calibration region may be established. For example, the surface may include a microscopic groove, ridge, pit, bump, or other mark since all of those configurations would extract light from the interior region.

The marks, if of uniform height or depth that is a small fraction of the wavelength of the illuminating light, cause uniform spread of light over the surface 20A, resulting in an optical signal modified in intensity only by the absolute intensity of the light in the effanescent field at its location. The calibrated reduction in light at that location can subsequently be compared to the flying height measurement.

Moreover, in various embodiments, the grooves or pits may be filled with a material, and the ridges or bumps may be surrounded with a material that does not substantially affect the ability to extract light but which establishes surface, so as to reduce any aerodynamic effect that might otherwise be present due to the groove, pits, ridge, or bump. Exemplary configurations a such calibration regions are shown in FIGS. 5A–5D, showing respectively for a disk 20, a groove 102, a filled groove 104, a ridge 106, a planarized ridge 108, 109 and in FIGS. 5E–5F, showing respectively four radial lines 110 and a uniform dot pattern 112. This self-calibration feature of the invention permits automatic adjustment for light fluctuations, coupling variations and propagation losses.

Therefore, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Apparatus for determining characteristics of a magnetic transducing head, said head including a reference surface having at least one reference point comprising:
   A. a fluid environment characterized by a predetermined index of refraction,
   B. a substantially transparent rigid disk disposed in said environment and having an interior region extending between a first planar circular surface and a second planar circular surface and within an outer peripheral lateral surface, said first and second surfaces being parallel and coaxial with respect to a central axis transverse to said first and second surfaces, said interior region being characterized by an index of refraction greater than said predetermined index of refraction of said fluid environment,
   C. means for positioning said transducing head with said reference surface opposite said first surface of said disk, and including means for biasing said transducing head toward said disk along a bias axis extending at least in part in the direction of said central axis,
   D. a driver including means for rotating said disk about said central axis whereby said reference surface is spaced apart from said first surface of said rotating disk in response to a relative flow of fluid between said reference surface and said first surface,
   E. an illumination assembly including a light source and means for directing light from said light source into said disk at an angle with respect to said first and second surfaces whereby substantially total internal reflection of said directed light is established within said interior region of said disk,
   F. a detector assembly disposed opposite said second surface of said disk, and including detector means opposite said transducing head for detecting, at points opposite to at least one of said reference points on said reference surface, the intensity of light propagating from the interior region of said disk, and for generating an intensity signal representative thereof, wherein said detector means and said transducing head are aligned along a sensing axis, said sensing axis being perpendicular to said planar surfaces of said disk.

2. Apparatus according to claim 1, further comprising means responsive to said intensity signal for determining the separation of said reference surface with respect to said first surface of said disk.

3. Apparatus according to claim 1 wherein said detector means includes means for detecting the intensity of light in said interior region of said disk at points opposite three of said reference points on said reference surface and for generating a signal representative thereof.

4. Apparatus according to claim 3, further comprising means responsive to said intensity signal for determining the position and orientation of said reference surface with respect to said first surface of said disk.

5. Apparatus according to claim 1 wherein said fluid environment is gaseous.

6. Apparatus according to claim 1 wherein said fluid environment is at least in part liquid.

7. Apparatus according to claim 1 wherein said illumination assembly includes means for coupling said directed light through said outer peripheral lateral surface into said interior region of said disk.

8. Apparatus according to claim 7 further comprising filter means positioned between said light source and said outer peripheral lateral surface for passing substantially only light linearly polarized along an axis substantially perpendicular to said first and second surfaces.

9. Apparatus according to claim 1 wherein said disk is annular and extends from an inner peripheral lateral surface to said outer peripheral lateral surface.

10. Apparatus according to claim 9 wherein said illumination assembly includes means for coupling said directed light through said inner lateral peripheral surface into said interior region of said disk.

11. Apparatus according to claim 10 further comprising filter means between said light source and said inner peripheral surface for passing substantially only light linearly polarized along an axis substantially perpendicular to said first and second surfaces.

12. Apparatus according to claim 1 wherein said detector further comprises means for selectively moving said detector means and said head positioning assembly in concert in an at least partially radial direction with respect to said central axis, while maintaining said detector means in position to detect the intensity of light in said disk opposite said reference point on said reference surface.

13. Apparatus according to claim 1 wherein biasing means is effected by pressure in said fluid environment adjacent to said transducing head.

14. Apparatus according to claim 1 wherein said biasing means establishes a force on said transducing head which is proportional to distance and is in the direction of said bias axis and toward said disk.

15. Apparatus according to claim 1 wherein said disk on one of said first and second surfaces includes calibration means for extracting a portion of said internally reflected light from said interior region of said disk.

16. Apparatus according to claim 15 wherein said calibration means includes
   a calibration element characterized by an index of refraction different than said index of refraction of said interior region, and disposed opposite said first surface and separated from said first surface by a predetermined distance and wherein said detector assembly includes means for detecting the intensity of light in said interior region of said disk at points opposite said calibration element.

17. Apparatus according to claim 15 wherein said calibration means includes a groove in said first surface of said disk, and
   wherein said detector assembly includes means for detecting the intensity of light in said interior region of said disk with said groove opposite said detector assembly.

18. Apparatus according to claim 17 further comprising a filler material disposed within said groove whereby said filler material and said first surface from a smooth planar surface.

19. Apparatus according to claim 17 wherein said groove extends at least partially in a radial direction with respect to said central axis.

20. Apparatus according to claim 15 wherein said calibration means includes a ridge on said first surface of said disk, and wherein said detector assembly includes means for detecting the intensity of light in said interior region of said disk with said ridge opposite said detector assembly.

21. Apparatus according to claim 20 further comprising a filler material disposed about said ridge whereby said filler material and said first surface from a smooth planar surface.

22. Apparatus according to claim 20 wherein said ridge extends at least partially in a radial direction with respect to said central axis.

23. Apparatus according to claim 15 wherein said calibration means includes a plurality of pits in said first surface of said disk, and wherein said detector assembly includes means for detecting the intensity of light in said interior region of said disk with at least one of said pits opposite said detector assembly.

24. Apparatus according to claim 23 further comprising a filler material disposed within said pits whereby said filler material and said first surface from a smooth planar surface.

25. Apparatus according to claim 15 wherein said calibration means includes a plurality of bumps on said first surface of said disk, and wherein said detector assembly includes means for detecting the intensity of light in said disk with at least one of said bumps opposite said detector assembly.

26. Apparatus according to claim 25 further comprising a filler material disposed about said bumps whereby said filler material and said first surface from a smooth planar surface.

* * * * *